Figure 1:
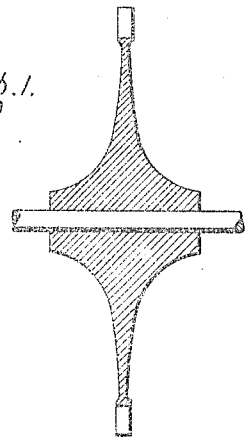

No. 804,410. PATENTED NOV. 14, 1905.
H. KELLER.
BUCKET WHEEL FOR ELASTIC FLUID TURBINES.
APPLICATION FILED MAY 4, 1905.

Witnesses
Lloyd C Bush
Helen Oxford

Inventor
Huldreich Keller
by Albert G. Davis
Atty.

UNITED STATES PATENT OFFICE.

HULDREICH KELLER, OF BERLIN, GERMANY, ASSIGNOR TO GENERAL ELECTRIC COMPANY, A CORPORATION OF NEW YORK.

BUCKET-WHEEL FOR ELASTIC-FLUID TURBINES.

No. 804,410.     Specification of Letters Patent.     Patented Nov. 14, 1905.

Application filed May 4, 1905. Serial No. 258,799.

*To all whom it may concern:*

Be it known that I, HULDREICH KELLER, a citizen of Switzerland, residing at Berlin, Germany, have invented certain new and useful Improvements in Bucket-Wheels for Elastic-Fluid Turbines, of which the following is a specification.

In the construction of bucket-wheels for turbines having high peripheral speed special care must be exercised in proportioning the thickness of the stock forming the hub and web. This is particularly true where the wheel is bored centrally to receive the shaft. In order that the strains near the center of the wheel shall not exceed a certain amount, the hub is made very long and heavy. Such a construction is found in the well-known Laval wheels. Wheels having these long and heavy hubs with a large mass near the hub are difficult to cast on account of unequal strains, which give rise to the formation of cracks, and thereby decrease the strength of the wheel. It is also difficult to properly balance a wheel of this last-mentioned character. Another objection to this construction, due to the long hubs, resides in the fact that the main bodies of the wheels in a multistage machine have to be widely separated, which means increased over-all length. Owing to the great weight of the wheels, the shaft is necessarily large, with high surface friction, and is subjected to a considerable bending moment, which necessitates an intermediate or middle bearing. This introduces the complication of a divided machine and an extra bearing.

The present invention has for its object to overcome the objections above pointed out and to provide a wheel which has a relatively light hub, yet is amply strong to withstand heavy centrifugal strains. In other words, the object of the invention is to save material without sacrificing strength and at the same time reduce the total length of the shaft for a given machine.

In carrying out my invention the wheel-web is provided with a suitably-formed rim for supporting one or more rows of buckets. The buckets may be made and attached in any well-known manner. The web is gradually increased in thickness toward the shaft, where it terminates in a relatively small hub having one or more peripheral grooves. Wound in the groove or grooves is a predetermined amount of steel or other tough wire, which is preferably ductile and of high tensile strength. The tension of the wire should be measured as it is applied to the hub, so as to give the band the strength which dynamic calculation shows to be correct. After the wire is once wound in place it should not be subjected to excessive heat.

Figure 2:
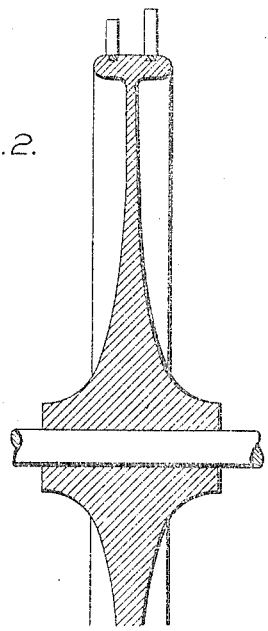

In the accompanying drawings, which illustrate one embodiment of my invention, Figure 1 is an axial section of a Laval wheel intended for high peripheral speeds. Fig. 2 is a partial axial section of an old-style wheel also intended for high peripheral or bucket speeds, and Fig. 3 is an axial section of a wheel built in accordance with my invention.

In Fig. 1 it will be seen that the length of the hub is very great as compared with the diameter of the wheel, also that the hub and the portion of the web adjacent thereto contain a very large mass of metal.

In Fig. 2 a large wheel is shown having two rows of buckets intended to revolve at a high speed, although somewhat lower than the one shown in Fig. 1. The large size and mass of metal in the hub and adjacent part of the web is, however, plainly noticeable.

Figure 3:
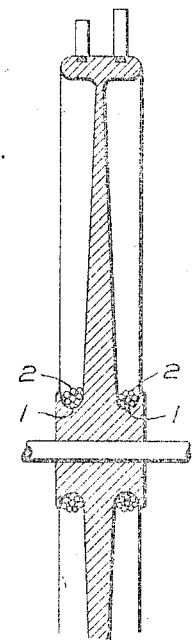

In Fig. 3 is shown a wheel constructed in accordance with my invention and intended for high peripheral speeds. The length of the hub has been decreased by half and a large amount of metal has been saved both in the hub and in the web adjacent to the hub. Reducing the weight of the wheels means that the shaft can be shorter and of less diameter. The hub on each side of the web is grooved at 1, and wound in these grooves are bands of wire 2. This wire should be strong and be wound on the hub under tension and the ends properly secured. The amount of wire will of course depend upon the speed at which the wheel is to be rotated.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In a bucket-wheel for elastic-fluid turbines, the combination of a web having a relatively small grooved hub, a wire band having high tensile strength which is wound in the groove under tension for increasing the strength of the hub, and buckets carried by the web for causing rotation.

2. In a bucket-wheel for elastic-fluid turbines, the combination of a web which gradually increases in thickness from the rim toward the center and is provided with a relatively small hub which projects on each side of the web, grooves formed in the hub on opposite sides of the web, independent bands of wire which are wound in the grooves under tension, and buckets carried by the web for causing rotation.

In witness whereof I have hereunto set my hand this 18th day of April, 1905.

HULDREICH KELLER.

Witnesses:
RICHARD KRAUSS,
FRIEDRICH WAGNER.